Feb. 28, 1928.
L. M. PERSONS
POLE CABLE TERMINAL
Filed June 18, 1926
1,660,815
2 Sheets-Sheet 2
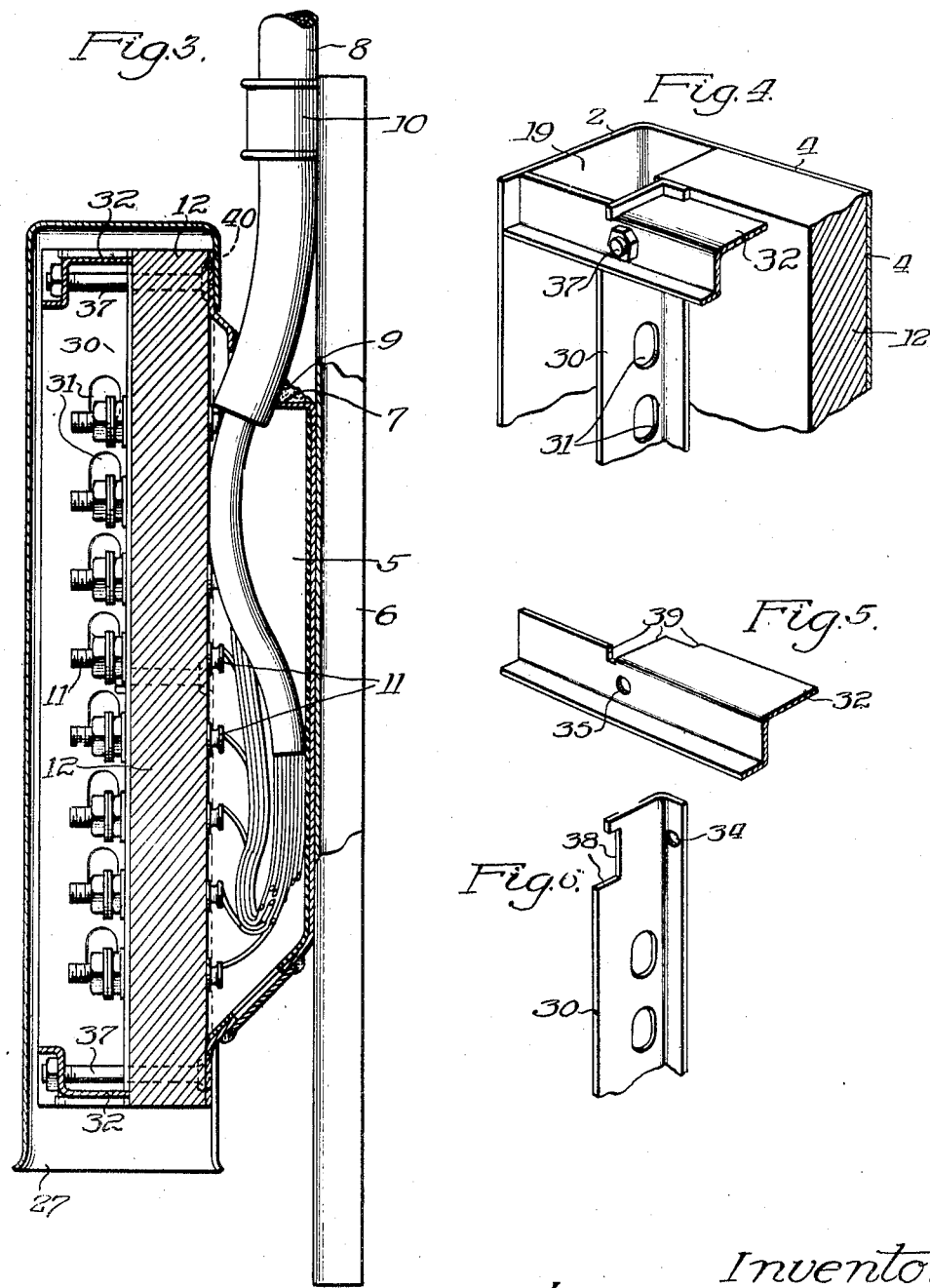
Inventor.
Lawrence M. Persons
Jones, Addington, Ames & Siebold
Attys:

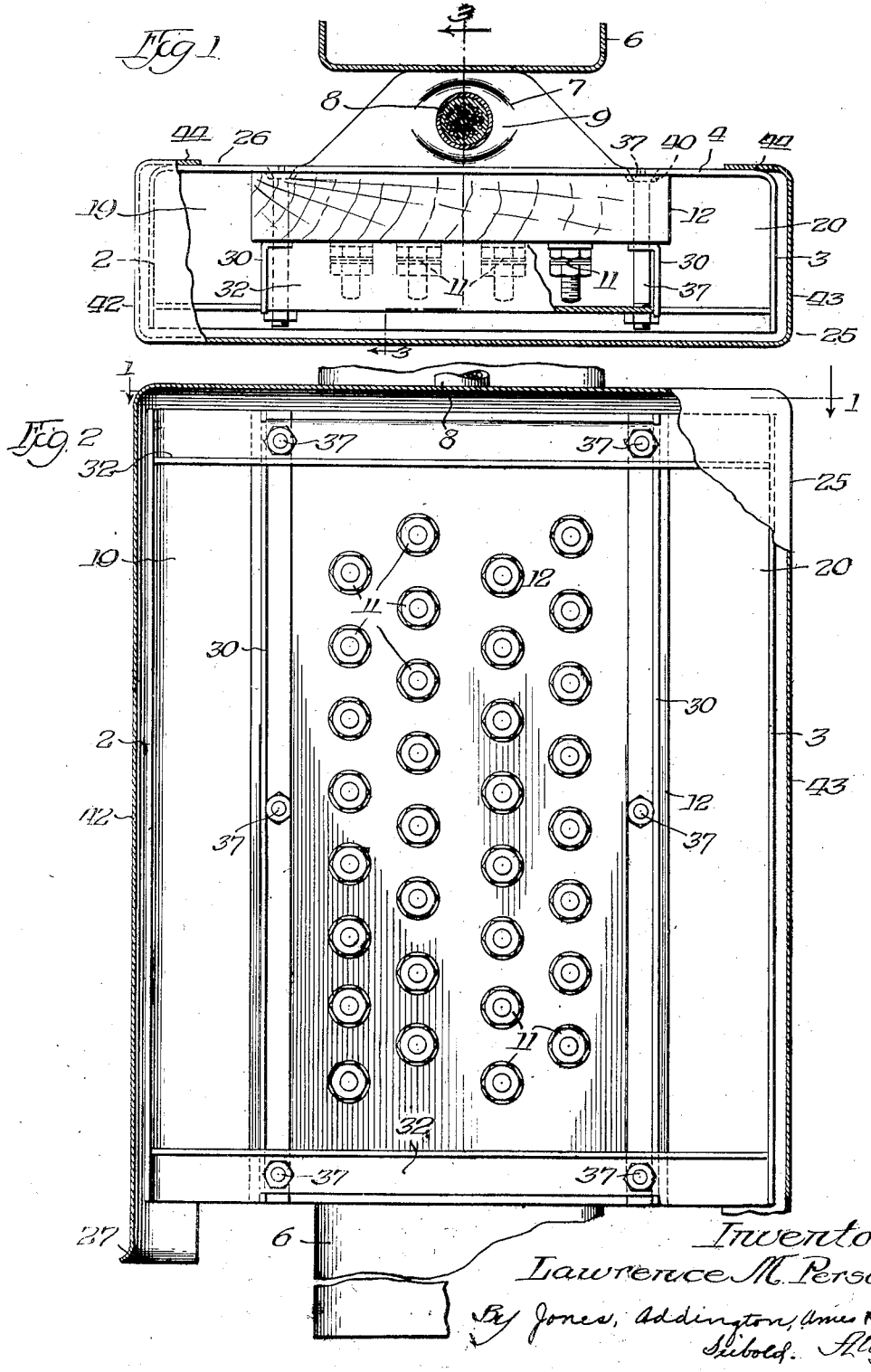

Patented Feb. 28, 1928.

1,660,815

UNITED STATES PATENT OFFICE.

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS.

POLE CABLE TERMINAL.

Application filed June 18, 1926. Serial No. 116,533.

My invention relates to cable terminal structures and more particularly to terminal boxes for electric cables adapted to be mounted on telephone poles and other supports, carrying telephone line cables, to provide for ready connection to the drop wires leading to the subscribers' instruments.

In my copending application, Serial Number 35,033, I have disclosed an improved form of cable terminal, which is capable of being reversed to receive the cable at either end. Both ends are preferably made similar, and fanning strips are provided to allow the drop wires to extend from either end. Due to the reversibility of the cover at these ends and the ability of the box itself to be reversed in position, it became unnecessary to carry in stock two types of boxes, namely, one in which a cable enters through the top wall and another in which it enters through the bottom wall. In this prior structure, however, the fanning strips were arranged at the ends of the contact mounting plate, and only a single compartment was provided in the box. There are times when side compartments for the drop wires and a central compartment completely closed off for the terminal connections are desirable. A closed central compartment will exclude the dust and dirt which tends to bridge the terminal posts and cause short circuits.

One of the objects of the present invention is to provide a terminal box of improved construction, having, as one of its features, an improved arrangement within the box whereby the fanning strips and end frames, providing a closed central compartment and side compartments, cooperate with each other to form a rigid frame adapted to be clamped in position at the front of the contact mounting plate to strengthen or reinforce the plate.

It is a common experience to find this plate warping or splitting due to the manner in which it is bolted in position. Plates made of wood readily split and warp, while plates made of moulded insulating compound often split. By providing a frame of this type in a terminal box, the difficulty heretofore experienced is overcome, and, at the same time, a stronger structure having a more desirable arrangement may be obtained at considerably less cost.

It will be observed that the device is preferably of pressed metal instead of the usual casting heretofore used. Many advantages well known to those skilled in the art are thereby obtained, one of which being that a lighter and more durable structure can be had which will not fracture when subjected to strain.

An important feature of my invention resides in the provision of a reinforcing frame at the front of the contact mounting plate which utilizes for its members the fanning strips and end frames which are invariably required in devices of this type.

Other objects and advantages will be apparent from the following detailed description taken in connection with the accompanying drawings which form a part hereof.

In the drawings:

Figure 1 is a top plan view of an assembled structure embodying the features of my invention, with the cover and the upper end frame partly broken away to show the interior construction;

Fig. 2 is a front elevation of the same, also with the cover partly broken away;

Fig. 3 is a vertical transverse sectional view taken on line 3—3 of Fig. 1;

Fig. 4 is a sectional detail view illustrating the manner in which the side fanning strips interlock at their adjoining ends with the end frames;

Fig. 5 is a detail view of one of the ends of the end frame; and

Fig. 6 is a similar view of a cooperating end of a fanning strip.

As illustrated in the drawings, the cable terminal structure comprises a housing preferably made of sheet metal, such as pressed steel, having forwardly extending sides 2 and 3 and a rear wall 4. This rear wall 4 is preferably formed with a cavity portion 5. Cavity 5 is located intermediate the ends of the rear wall and its walls are drawn with a slight taper away from the rear wall (as shown in Fig. 1) in the direction of a mounting bracket 6. The housing may be positioned upon mounting bracket 6 in any of the many well-known ways, which mounting bracket may then be suitably fastened to the usual telephone pole or other support.

In the forming operation of the housing, a recess 7 may be provided. A cable 8 is adapted to enter the interior of the housing at cavity 5 through this recess. Solder 9 may then be puddled in this recess to form a tight connection between cable 8 and the housing. The cable may then extend along the mounting 6 and may be firmly gripped by a strap 10 carried by the mounting bracket 6. The cable conductors enter cavity 5 and may be secured to contacts 11 extending to the rear face of a contact mounting plate 12 in any suitable manner, as by soldering the cable wires directly to the heads of the binding posts. After the connections to this side of the binding posts are completed, the cavity 5 may be filled with any suitable molten insulating compound, which will harden upon cooling and which will serve to maintain these connections in their proper arrangements.

Mounting plate 12 may be suitably fixed in place against the rear wall 4 over cavity 5. It will be observed that the mounting plate 12 terminates on each side a short distance from end walls 2 and 3. Mounting bolts 37, employed to hold the plate in position over the cavity, pass through the mounting plate from the rear wall 4 to secure vertically-arranged fanning strips 30 disposed along the sides of the mounting plate 12, and also horizontally-arranged end frames 32, which are adapted to interlock at their adjoining ends with the fanning strips. Holes 34 and 35 are provided in the fanning strips and end frames to receive bolts 37.

For the purpose of strengthening these fanning strips 30, it is preferable to form them angular in cross section and with one leg abutting the front face of mounting plate 12. A series of openings are arranged in the other leg of the fanning strips to allow distributing or drop wires to extend from the contacts 11 into vertical compartments 19 and 20, provided between the side walls 2 and 3 and the sides of the mounting plate and fanning strips. It will be observed that compartments 19 and 20 are open at both ends to permit the drop wires to extend out of the terminal box. By providing these compartments open at both ends, it is possible to mount the terminal box on either end, that is, provide it reversible so as to employ the box both where the cables extend in an upward and in a downward direction along the telephone pole.

End frames 16 are also novelly formed to strengthen them and are provided with a series of interlocking edges 39 for cooperating with similar edges 38 on the fanning strips 15. The manner in which these members interengage and lock together will be clearly seen in Fig. 4. By interlocking the members in this way, a frame is provided which is positioned at the front face of the mounting plate, being carried by the bolts 37, which are in turn secured to the rear face. Depressions forming inwardly turned apertured bosses 40 are provided in the rear face to receive the heads of bolts 4 in countersunk relation. Hence, the strain resulting from clamping the frame in position is carried by the rear wall 4 and due to this arrangement the plate is not weakened by the bolts 37 passing therethrough.

Cover 25 is adapted to slidably fit over the housing to cover at least one of the ends and the front side of the structure. Cover 25 may be in the form of a hood, also formed of sheet metal and provided with a slot 26 at one side for allowing the cover to slip down over the housing without interfering with the cavity portion 5. With the exception of this slot 26, the cover forms an enclosure having but one end open, and this end may be provided with a flare edge 27 for the purpose of facilitating the mounting of the cover when first slipped over the end of the housing and also for diverting water and dirt away from the open end.

By providing the side walls 2 and 3 on the housing, the rear ends of the side extensions 42 and 43 on the cover may be bent inwardly at 44 to resiliently engage against the rear face of the wall 4 and apply sufficient force to hold the cover in position. This arrangement eliminates additional holding devices for the cover and accordingly simplifies the construction and reduces cost of manufacture. The side walls 2 and 3 not only reinforces the portion of the rear wall 4, which is engaged at 44 by the cover, but also assures that side compartments 19 and 20 are adequately protected against dirt, rain and sleet by being properly closed at their sides. In practice, this construction is preferable to a device having side walls 2 and 3 omitted and relying on side extensions 42 and 43 to act as the side walls of side compartments 19 and 20, due to the tight fit which would then be required and which is difficult to obtain because of manufacturing inaccuracies. While the cover construction disclosed herein is of particular utility, it will be remembered that other covers may be used without affecting the utility of the fanning strips 30 and end members 32 as a reinforcing frame at the front of plate 12. Either feature may be employed separately, if so desired.

The interengaging edges 38 and 39 are provided with a view of rigidly interlocking fanning strips 30 and end frames 32 against movement in a plane parallel to the plane of plate 12. Bolts 37 serve as means for preventing movement in a transverse plane. Obviously the rigid frame resulting from the interlocking relation of these members will be clamped in position to the rear wall 4 by the bolts 37 and no strain will be placed on the plate. Hence, the plate is reinforced, because the rigid frame evenly presses against the plate about its entire edge to overcome any weakening of the plate at points where the bolts pass therethrough, as heretofore experienced in the prior art structures. Being interlocked in all directions, the fanning strips and end frames also eliminate any tendency of plate 12 to warp or split.

The fanning strips and end frames serve the additional purpose of providing a closed central compartment and vertical side compartments, which have their ends open to permit the drop wires leading to the subscribers' instruments to pass out of the box at either end.

Various changes in the detail structure of different parts of the terminal box may be made without departing from the scope and spirit of the invention.

I claim:

1. A cable terminal comprising a rear wall, two side walls extending forwardly from said rear wall, a contact mounting plate seated in spaced relation between said side walls, vertical fanning strips and end frame members cooperating at their adjoining ends to form a substantially rectangular frame about the edges of said contact mounting plate, and means for clamping said frame against said contact mounting plate for securing the latter against said rear wall.

2. A cable terminal comprising a housing including a rear wall and forwardly extending side walls, a contact mounting plate disposed in said housing in spaced relation between said side walls, a cover for said housing forming a detachable front wall therefor, fanning strips disposed along the sides of said contact mounting plate, end frame members at the upper and lower ends of said fanning strips and cooperating with said fanning strips to provide compartments at the sides of said contact mounting plate, and means for clamping said fanning strips against said contact mounting plate.

3. A cable terminal comprising a housing having opposite side walls and a removable cover forming a detachable front wall for said housing, a contact mounting plate disposed in spaced relation between said side walls, and means carried at the front of said contact mounting plate forming cooperating fanning strips and end frame members to provide compartments at the sides of said contact mounting plate.

4. A cable terminal comprising a housing having opposite side walls, a contact mounting plate disposed between said side walls, and means carried against the front face of said contact mounting plate forming cooperating fanning strips and end frame members to provide compartments at the sides of said contact mounting plate.

5. A cable terminal comprising a housing having opposite side walls, a contact mounting plate, vertical fanning strips, and horizontal end frame members cooperating with said fanning strips at their adjoining ends to form a frame, and means for clamping said frame against said contact mounting plate whereby to secure said plate to said housing.

6. A cable terminal comprising a housing including a rear wall, a contact mounting plate disposed in said housing, and a rigid frame provided with means to clamp the frame against said contact mounting plate whereby to secure the plate to said rear wall, said frame including fanning strips disposed along the sides of said plate.

7. A cable terminal comprising a housing including a rear wall, a contact mounting plate disposed in said housing, and a rigid frame provided with means to clamp the frame against said contact mounting plate whereby to secure the plate to said rear wall, said frame including fanning strips disposed along the sides of said plate, and end frame members cooperating with said fanning strips to provide side compartments having open ends.

8. A cable terminal comprising a housing including a rear wall and a contact mounting plate carried thereby, and a frame arranged at the front of said plate comprising fanning strips for providing compartments at the sides of said plate, and end frame members cooperating with said fanning strips to provide open ends for said compartments.

9. A cable terminal comprising a housing, a contact mounting plate disposed therein, and means for securing said plate in position comprising a frame adapted to be clamped against the plate to reinforce the same, said frame providing a central compartment and two lateral compartments disposed one at each side of said plate.

10. A cable terminal comprising a housing, a contact mounting plate disposed therein, and means for securing said plate in position comprising a frame arranged to reinforce the plate, said frame including fanning strips which provide a central compartment and two lateral compartments.

11. A cable terminal comprising a housing, a contact mounting plate disposed therein, and means for securing said plate in position comprising a frame arranged to clamp against and thereby reinforce the plate, said frame including fanning strips and cross members interlocking at their adjoining ends with said fanning strips.

12. A cable terminal comprising a housing, a terminal plate disposed therein, and means disposed at the front of said plate for reinforcing the same, said means comprising fanning strips disposed along the plate and cross members cooperating therewith adjacent their ends.

13. A reversible cable terminal comprising a housing having a rear wall and two opposite side walls extending forwardly therefrom, a cover forming a detachable front wall for said housing, a terminal plate exposed therein, fanning strips providing compartments at the sides of said plate, and frame members cooperating with said plate to form end closures for said housing, said fanning strips and said frame members lying substantially at the front of said terminal plate.

14. A reversible cable terminal comprising a housing having a rear wall and two opposite side walls extending forwardly therefrom, a cover forming a detachable front wall for said housing, a terminal plate extending substantially to the plane of both end edges of said rear wall, and frame members disposed substantially at each end edge and carried at the front of said plate for serving as end closures for said housing.

15. A reversible cable terminal comprising a housing having a rear wall and two opposite side walls, a terminal plate and side fanning strips associated therewith to provide a central compartment and two lateral compartments arranged one on each side of said plate and the adjacent side wall, and frame members at the ends of said plate for closing said central compartment but providing openings for the ends of said lateral compartments, said frame members being arranged at the front of said plate.

16. A cable terminal comprising a housing, a contact mounting plate disposed therein, and frame members positioned on one side of said plate for reinforcing the plate, said frame members being provided with interengaging edges at their adjoining ends to interlock the frame members against movement in a plane parallel to that of the plate and with means for holding the frame members against movement in a plane transverse to that of the plate.

17. A cable terminal comprising a housing having a rear wall, a contact mounting plate disposed in said housing, and frame members interlocking to form a rigid reinforcing unit against one face of the plate, said frame members having means for preventing movement thereof in a plane parallel to the face of the plate and fastening means extending through each of the frame members substantially at their adjoining ends and through the rear wall whereby to hold the plate in position between the frame members and the rear wall.

18. A cable terminal comprising a support, a contact mounting plate on said support, and means for securing said plate to said support comprising a frame adapted to be clamped against the plate to reinforce the same against splitting and warping.

19. A cable terminal comprising a support, a contact mounting plate on said support, and frame members for reinforcing said plate, said frame members interlocking with each other to prevent movement of the individual frame members in planes parallel and transverse to that of the plate.

In witness whereof, I have hereunto subscribed my name.

LAWRENCE M. PERSONS.

CERTIFICATE OF CORRECTION.

Patent No. 1,660,815.            Granted February 28, 1928, to

LAWRENCE M. PERSONS.

It is hereby certified that error appears in the printed specification of the above numbered patent requiring correction as follows: Page 4, lines 2 and 3, claim 13, for the word "exposed" read "disposed"; and that the said Letters Patent should be read with this correction therein that the same may conform to the record of the case in the Patent Office.

Signed and sealed this 1st day of May, A. D. 1928.

(Seal)

M. J. Moore,
Acting Commissioner of Patents.

CERTIFICATE OF CORRECTION.

Patent No. 1,660,815.                                Granted February 28, 1928, to

LAWRENCE M. PERSONS.

It is hereby certified that error appears in the printed specification of the above numbered patent requiring correction as follows: Page 4, lines 2 and 3, claim 13, for the word "exposed" read "disposed"; and that the said Letters Patent should be read with this correction therein that the same may conform to the record of the case in the Patent Office.

Signed and sealed this 1st day of May, A. D. 1928.

(Seal)                                                                M. J. Moore,
Acting Commissioner of Patents.